United States Patent
Schütz et al.

(10) Patent No.: US 8,068,967 B2
(45) Date of Patent: Nov. 29, 2011

(54) METHOD OF CONTROLLING AN INHOMOGENEOUS ROADWAY

(75) Inventors: Christof Schütz, Flörsheim (DE); Yann Andrè, Frankfurt (DE); Robert Gutwein, Frankfurt (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 799 days.

(21) Appl. No.: 12/065,760

(22) PCT Filed: Sep. 14, 2006

(86) PCT No.: PCT/EP2006/066384
§ 371 (c)(1),
(2), (4) Date: Jul. 21, 2008

(87) PCT Pub. No.: WO2007/031567
PCT Pub. Date: Mar. 22, 2007

(65) Prior Publication Data
US 2008/0312793 A1    Dec. 18, 2008

(30) Foreign Application Priority Data

Sep. 14, 2005 (DE) .......... 10 2005 043 727
Sep. 14, 2006 (DE) .......... 10 2006 043 931

(51) Int. Cl.
*B62D 6/00* (2006.01)
*B60T 8/60* (2006.01)

(52) U.S. Cl. .......... 701/73; 701/41; 303/147; 303/148; 303/50

(58) Field of Classification Search .......... 303/147, 303/148, 150; 701/41, 73
See application file for complete search history.

(56) References Cited

U.S. PATENT DOCUMENTS

| | | | |
|---|---|---|---|
| 5,407,258 A | 4/1995 | Giers et al. | |
| 5,865,514 A | 2/1999 | Striegel et al. | |
| 6,000,765 A * | 12/1999 | Hinz et al. | 303/148 |
| 6,968,920 B2 * | 11/2005 | Barton et al. | 180/446 |
| 7,322,660 B2 * | 1/2008 | Batistic et al. | 303/186 |
| 7,775,608 B2 * | 8/2010 | Schmidt et al. | 303/148 |
| 2002/0198646 A1 * | 12/2002 | Bedner et al. | 701/48 |
| 2006/0100766 A1 | 5/2006 | Schwarz et al. | |
| 2007/0188020 A1 | 8/2007 | Schmidt et al. | |

FOREIGN PATENT DOCUMENTS

| | | |
|---|---|---|
| DE | 3925828 | 2/1991 |
| DE | 4038079 | 6/1996 |
| DE | 19751227 | 9/1998 |
| DE | 102004017845 | 4/2005 |
| GB | 2298013 | 8/1996 |
| WO | 0196159 | 12/2001 |

* cited by examiner

*Primary Examiner* — Tony H. Winner
*Assistant Examiner* — Marc Scharich
(74) *Attorney, Agent, or Firm* — Brinks Hofer Gilson & Lione

(57) ABSTRACT

To determine an inhomogeneous roadway in µ-split situation during active ABS control and active yaw torque control (YTC) of a front wheel (HM-wheel) on the high-coefficient-of-friction side, it is arranged that at least the following conditions must be satisfied before the µ-split situation is flagged:

a) a front wheel (LM wheel) undergoes ABS control in a pressure reduction phase; a1) the LM front wheel is in the first ABS control cycle;

b) the LM front wheel exhibits a deceleration exceeding a defined threshold;

c) the locking pressure level of the LM front wheel is lower than a defined threshold;

d) the front wheel on the high-coefficient-of-friction side (HM wheel) exhibits a filtered deceleration that is lower than a defined threshold;

e) the vehicle deceleration calculated by ABS is lower than a defined threshold.

16 Claims, 4 Drawing Sheets

Asymmetric Brake Forces and Disturbing Yaw Torque

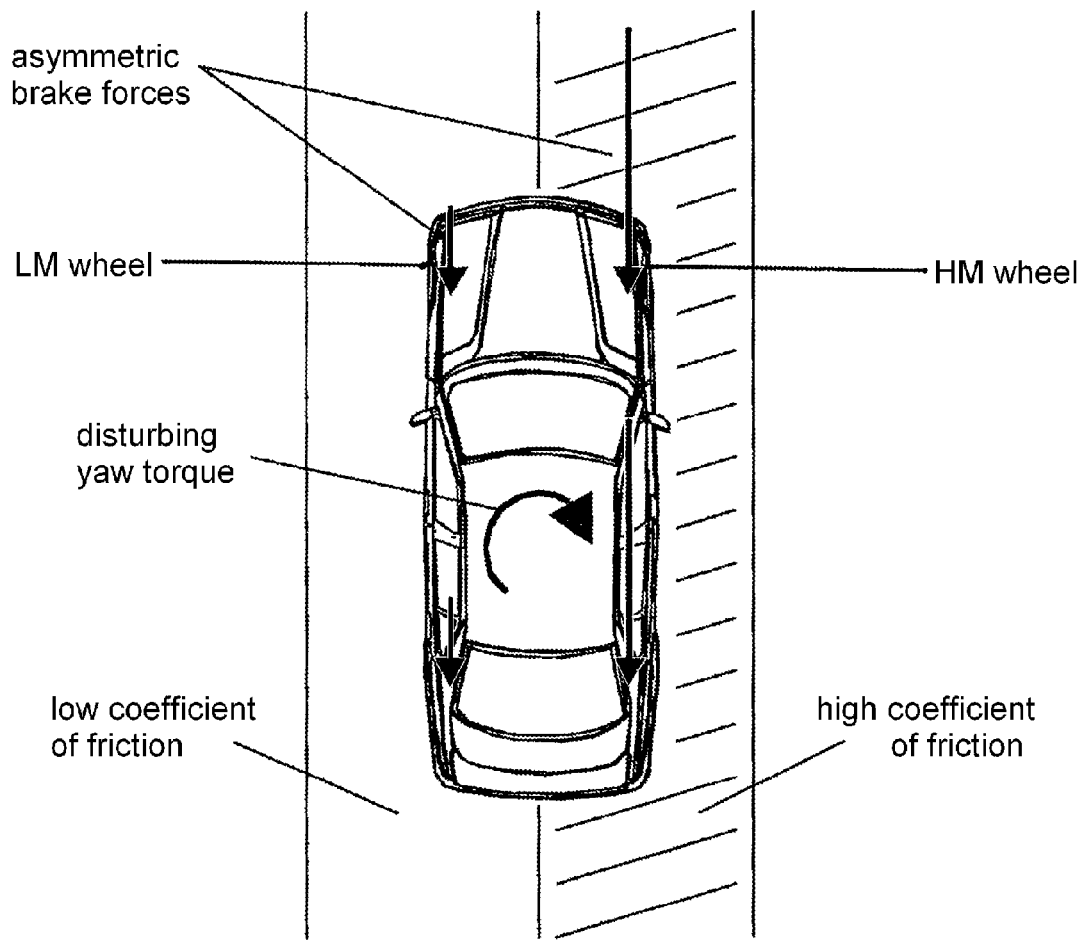
Fig. 1 Asymmetric Brake Forces and Disturbing Yaw Torque

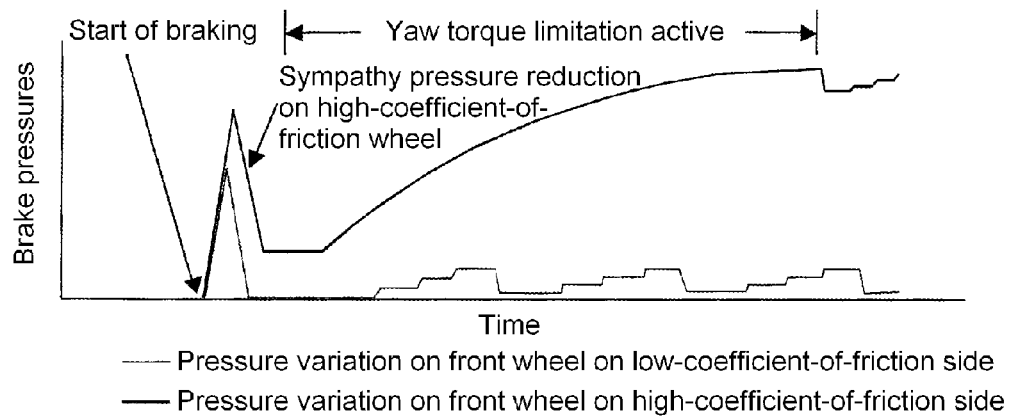
Fig. 2a  Pressure variation on front axle with active yaw torque limitation
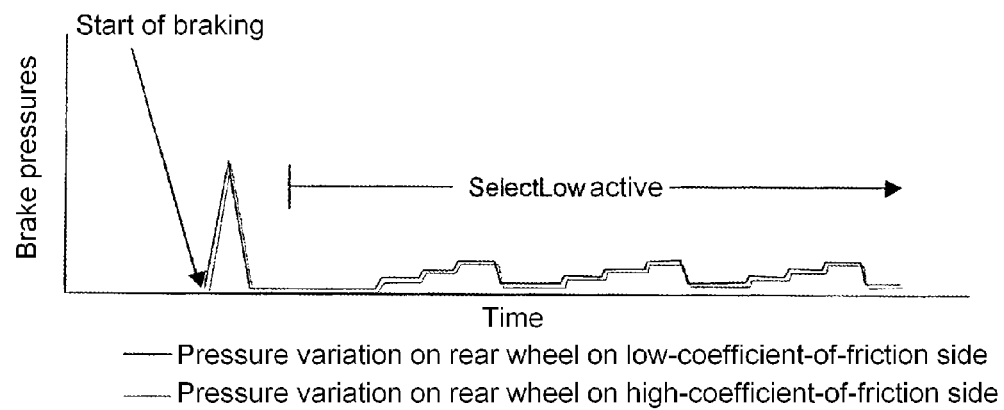
Fig. 2b  Pressure variation on rear axle with active SelectLow

METHOD OF CONTROLLING AN INHOMOGENEOUS ROADWAY

BACKGROUND OF THE INVENTION

The present invention relates to a method of determining an inhomogeneous roadway in a driving situation of vehicles, which are disposed on a roadway having sidewise different coefficients of friction, during active ABS control and active yaw torque control (YTC) of a front wheel (HM-wheel) on the high-coefficient-of-friction side, and to a method of generating an additive additional moment at the steering wheel or at the wheels of a vehicle, in which case the additional moment is applied depending on a driving situation to a roadway with sidewise different coefficients of friction (μ-split).

During braking on inhomogeneous roadways (i.e. roads with different coefficients of friction on the left and the right vehicle side), asymmetrical brake forces occur due to the different coefficients of friction (right-left). The result of the asymmetric brake forces is a yaw torque around the vertical axis of the vehicle, which causes the vehicle to carry out a yaw movement towards the side of the road with the higher coefficient of friction (see FIG. 1).

Vehicles, which are not equipped with the electronic brake system ABS, become unstable in such driving situations since the cornering force of the tires gets lost when the wheels block. The yaw torque resulting from the asymmetrical brake forces causes the vehicle to turn quickly around its vertical axis towards the side with the high coefficient of friction (swerve).

In order to prevent the wheels of the motor vehicle from blocking in consequence of excessive brake pressure generated by the vehicle operator when the brake is applied, with the motor vehicle losing its stability or its steerability as a result, the hydraulic brake system of the vehicle is equipped with an anti-lock control device, i.e. it is configured as a hydraulic brake system with anti-lock control.

When an imminent locked condition of one or more of the vehicle wheels is detected, an anti-lock control device is used to automatically modulate the brake pressure independently of the brake pedal force generated by the operator at least in part of the hydraulic brake system, i.e. the brake pressure is decreased, maintained constant and re-increased long until the tendency to lock no longer prevails. Hence follows that the general objective of anti-lock devices for hydraulic motor vehicle brake systems is to safeguard the directional stability and the steerability of the vehicle as well as shortest possible stopping or braking distances, in particular on slippery roadways and with maximum operation of the service brake system (e.g. during panic stops).

On roadways with coefficients of friction on the right/left side (μ-split) of a remarkably differently high rate, however, the directional and driving stability will be reduced due to the very differently high rates of effective brake forces on the right and the left vehicle wheels. This major asymmetry and imbalance of the effective brake forces on the right and the left vehicle sides will generate a more or less great yaw torque that turns the vehicle about its vertical axis depending on these asymmetric forces. To counteract this condition and preserve the directional and driving stability, i.e. to keep the vehicle on course, the operator would have to manipulate the steering wheel in this situation with an extremely quick reaction for correcting purposes, but even skilled drivers will manage to do so in such emergency situations only rarely to a more or less satisfying degree.

Thus, there is a general conflict of goals in such situations for anti-lock controlled hydraulic brake systems for motor vehicles. One objective is to achieve maximum short braking or stopping distances, on the one hand, however, it is also important to maintain the directional and driving stability as well as the steerability of the vehicle in a braking maneuver, on the other hand.

Therefore, it has meanwhile become the generally binding philosophy of the manufacturers and users of anti-lock controlled hydraulic motor vehicle brake systems to give priority to the preservation of the directional and driving stability as well as the steerability of the vehicle over reaching shortest possible stopping distances.

The ABS control strategy is adapted in such driving situations in order to maintain the directional and driving stability of the vehicle. In this case, at least the two rear wheels undergo anti-lock control according to the so-called 'Select-Low' principle, i.e. depending on the vehicle wheel that is operated with the lowest coefficient of friction at that moment. This implies that in the service situation described above only the same comparatively low brake pressure is applied to the brake of the rear wheel rotating at the higher coefficient of friction μ that is applied to the brake of the other rear wheel that rotates on the lower coefficient of friction, although the first-mentioned wheel could be braked to a greater degree without locking on account of its higher coefficient of friction. Thus, equally great or equally low brake forces are applied to both rear wheels so that these do not contribute to yaw torque generation. Since the rear wheel rotating at the higher coefficient of friction is braked to a less intense degree than possible, this wheel possesses a correspondingly high potential to govern lateral forces what is of benefit to the directional and driving stability of the vehicle.

The price paid for the good directional and driving stability implies in each case longer stopping distances since the vehicle wheels rotating at higher coefficients of friction are braked at a reduced rate in this control principle than the adhesion coefficient prevailing in this case would per se allow.

If the two front-wheel brakes are anti-lock protected individually by devices of their own in an anti-lock hydraulic motor vehicle brake system with rear wheels being anti-lock controlled according to the 'Select-Low' principle, it is conventional practice to weaken the effect of yaw torque, which possibly develops due to differently great brake forces on the right and the left front wheels, by a so-called 'Yaw Torque Limitation (YTL)' that is superimposed on the individual anti-lock control of the two front wheels. The overriding 'Yaw Torque Limitation' ensures that the brake pressure at the front wheel (HM wheel) rotating at the higher coefficient of friction builds up more slowly than it would per se be possible in order to use the resulting delayed buildup of yaw torque to give the operator additional time to react, i.e. for countersteering. Of course, the overriding 'Yaw Torque Limitation' also contributes to an additional certain worsening of the attainable braking and stopping distance.

Document 39 25 828 A1 discloses anti-lock control with YTL which, for the determination of the pressure difference, measures the pressure on the right and left wheel introduced by the driver and determines the admissible pressure difference by way of a comparison between the nominal pressure and the actual pressure. Moreover, DE 41 14 734 A1 describes an anti-lock system with YTL, which manages without pressure sensors and, based on pressure reduction signals, continuously determines a value representative of the pressure difference of the two wheels of the one axle.

Furthermore, DE 44 41 624 A1 discloses a 'Yaw Torque Limitation' which starts a special control mode during braking maneuvers on roadways with μ-split patches. The differences in brake pressure reduction on the front wheels, the vehicle speed, the slip of the LM front wheel, the period of instability of the LM front wheel, and the HM wheel are assessed as prescribed criteria for the activation of the special mode conditions.

There is no special μ-split detection in an anti-lock control with 'Select-Low' and YTL, FIGS. 2a and 2b showing its principal pressure variations. The result is that frequently YTL is detected, even if the vehicle is braking on a homogeneous roadway. When one front wheel enters ABS control, pressure is stopped immediately on the other front wheel, the HM wheel. A so-called sympathy reduction pulse can be carried out after the pressure stop at the high coefficient-of-friction wheel when the wheel behavior on the low coefficient-of friction side exhibits a certain dynamics. Further, the difference in pressure develops only slowly. A more precise detection of the inhomogeneous roadway is unnecessary in the YTL because the described behavior does not cause any essential loss in brake efficiency or loss in stability. The two front wheels have the same locking pressure level because the roadway is homogeneous. Therefore, the alleged high coefficient-of-friction wheel is close to the locking pressure level. This is why an undesirable YTL intervention is acceptable.

A motor vehicle with an anti-lock hydraulic brake system with YTL is known in the art (DE 40 38 079 A1). This system compensates the yaw torque developing in a μ-split driving situation during ABS control in that a compensation steering angle, which depends on the difference between the separately controlled brake pressures, is adjusted or superposed on the steering angle predetermined by the driver, respectively. The autonomous compensation steering angle improves the maneuverability in a braking maneuver on inhomogeneous roadways. The μ-split driving situation is determined based on the measured brake pressures or the brake pressures assessed by an assessing algorithm by way of the output data of the ABS valve actuation times.

This μ-split detection for vehicles with active steering, which is based on the calculation of the difference in pressures at the front axle between the wheels on the high and the low-coefficient-of-friction side results in that the detection occurs late. Therefore, the steering intervention cannot be initiated sufficiently early. The braking effect is hence not optimal. The risk of erroneous detection is also given because the wheel behavior is not analyzed. An erroneous YTL detection impairs the comfort or even the stability of the vehicle in an autonomous steering intervention.

In view of the above, it is an object of the invention to provide a μ-split detection in the anti-lock controller which can be used by an active steering system.

SUMMARY OF THE INVENTION

As has been mentioned before, the invention founds on anti-lock control with yaw torque limitation. According to the invention, μ-split detection in the ABS is provided because autonomous interventions into the steering system of a vehicle during μ-split driving situations are envisaged at an increasing rate. This new μ-split detection does not perform independently of the YTL detection because it is not possible unless YTL is active.

The inhomogeneous roadway is detected in a driving situation in which the vehicle is on a roadway with different coefficients of friction on either side and in the presence of active ABS control and active Yaw Torque Control (YTL) of a front wheel (HM wheel) on the high-coefficient-of-friction side.

The μ-split detection is safer because it is based not only on the pressure model. Erroneous detection is less likely. More intense steering interventions therefore may be initiated at the steering wheel without risking impairment of the stability due to erroneous detection.

In addition, the μ-split detection of the invention is quicker because a pressure difference between the wheels of an axle is not yet required to exist for the controller to initiate an intervention into the steering system. This way the use of the control system in combination with an active steering system renders it possible to shorten the stopping distance without loss in stability.

At least the following conditions must be satisfied to detect the inhomogeneous roadway:
 a) a front wheel (LM wheel) undergoes ABS control in a pressure reduction phase; a1) the LM front wheel is in the first ABS control cycle;
 b) the LM front wheel exhibits deceleration that exceeds a defined threshold;
 c) the locking pressure level of the LM front wheel is lower than a defined threshold;
 d) the front wheel on the high-coefficient-of-friction side (HM wheel) exhibits a filtered deceleration that is lower than a defined threshold;
 e) the vehicle deceleration calculated by ABS is lower than a defined threshold.

The first two features a) and a1) represent a confirmation that the controller has detected YTL and that the detection occurred based on the condition of phases of the ABS control cycle. The condition of phases reads: a front wheel undergoes ABS control. The other wheel is not under ABS control. When YTL is detected, there is the suspicion that the vehicle is braking on μ-split.

The features b) and c) represent a confirmation that the LM wheel is indeed on a low coefficient of friction.

Feature d) is a confirmation that this front wheel is on the high-coefficient-of-friction side.

Condition e) checks whether the vehicle deceleration, which is calculated by the anti-lock control, is lower than a defined threshold. The μ-split determination is plausibilised based on the deceleration of the front wheels on the low-coefficient-of-friction side and the high-coefficient-of-friction side taking into consideration the vehicle deceleration with a threshold value $F_v$ representative of the maximum vehicle deceleration on inhomogeneous roadways.

Furthermore, there is a plausibilisation based on the review and evaluation of the rotational behavior of the rear wheels following the determination of the roadway with different coefficients of friction on either side, which is performed based on the conditions a) to e). The rotational behavior of the LM rear wheel and the HM rear wheel is evaluated by way of their deceleration values during ABS control, in which case the HM rear wheel decelerates corresponding to the vehicle deceleration, while the LM rear wheel decelerates at a rate higher than the vehicle deceleration.

The deceleration signal of the vehicle is formed of two different partial signals for this purpose. The first signal is a low-pass filtered signal produced from the averaged filtered wheel deceleration signals. The other signal is a gradient, which calculates deceleration or acceleration in each case from two pairs of values (wheel speed and associated time) in defined intervals during the control. This signal is always identical with the vehicle deceleration when all wheels are subjected to the control and all conditions for the calculation of gradients are satisfied (a first pressure reduction phase on a wheel has already passed). Otherwise, the vehicle deceleration corresponds to the filtered signal.

The filtered signal is produced as follows:
Outside the control, all wheels are included
1. which are not in a phase of spinning,
2. which do not undergo ABS control,
3. which do not undergo BTCS control (brake intervention traction slip control system), and
4. the filtered ABS deceleration values of which lie in a defined band.

Within the control (all wheels are subjected to the control), only those wheels are taken into consideration
1. which are in a pressure increase phase,
2. the ABS deceleration values of which lie in a defined band.

The gradient is determined as follows:
At the beginning of an entry into slip (criterion: ABS deceleration value falls below a threshold) the controller 'memorizes' a pair of values of the respective wheel (time (t0) and wheel speed (v0)). After a defined waiting time (>t1−t0) the re-acceleration of the wheel is observed. When it decreases (end of the entry into slip), a second pair of values (t2, v2) is stored. A gradient is then calculated therefrom according to the formula dv/dt:

(v2−v0)/(t2−t0).

The threshold value $F_v$ lies preferably in a range between 0.6 and 0.8 g.

Suitably, the acceleration signal is filtered when determining the stable wheel HM in order to suppress signal noise.

When an inhomogeneous roadway is detected, a flag is set which can be read out by other control systems. The flag is deleted or forgotten when the yaw torque limitation (YTL) becomes inactive or when the re-acceleration of the LM front wheel after a pressure reduction phase is higher than a defined threshold. This second condition is a confirmation that the LM wheel is no longer on a low-coefficient-of-friction roadway.

The set µ-split information is preferably used to allow an intervention into a steering system and subsequently a steeper YTL pressure buildup.

According to the invention, a method to generate an additive additional moment at the steering wheel of the vehicle is provided, in which case the additional moment is imposed on the steering system depending on the determined inhomogeneous roadway with sidewise different coefficients of friction. The method of operating a steering system for a vehicle arranges for at least one electric servo steering system and a steering recommendation to the driver. In this case the steering movement $\delta_{DRV}$ initiated by the driver and the disturbance compensation component $\delta_2$ initiated from the steering recommendation to the driver are additively superposed using the steering handle in order to generate the steering motion. With the µ-split information set, an additional moment is determined from the brake forces of the wheel on the low-coefficient-of-friction side and the high-coefficient-of-friction side and is sent as a steering recommendation to the actuator of the servo steering system. The amount of the additional moment is only so high that the driver is still able to hold on to the steering wheel in opposition to the additional moment.

According to another embodiment, one or more additional moments are stored in a memory and sent as a steering recommendation to the actuator of the servo steering system, with the µ-split information set. In this arrangement, the additional moment presets the steering direction rather than the steering recommendation, which results from the current braking condition of the vehicle, as a compensation of the yaw torque for the steering wheels that is due to the asymmetric brake forces. Different additional moments can be sent as a steering recommendation to the actuator depending on the vehicle speed. Embodiments of the invention are illustrated in the drawings and will be described in detail in the following.

BRIEF DESCRIPTION OF THE DRAWINGS

In the accompanying drawings:
FIG. 1 is a representation of the asymmetric brake forces and the disturbance yaw torque on a vehicle;
FIG. 2 is a representation of the pressure variation of the wheel brakes on the front axle and the rear axle with an active YTL.

DETAILED DESCRIPTION OF THE DRAWINGS

Figure 3:
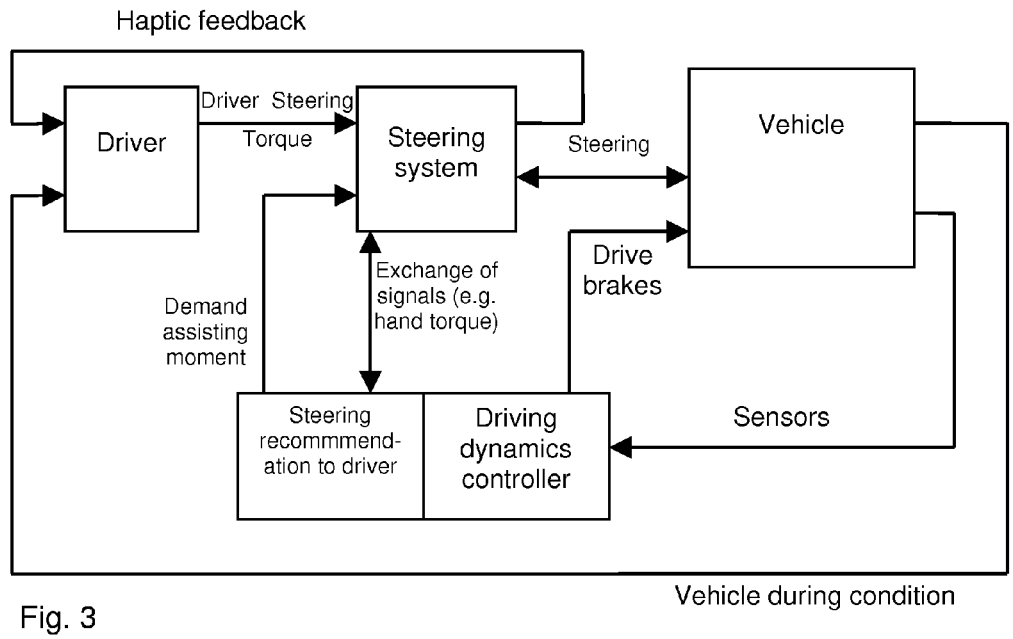
FIG. 3 shows a control system for the pressure development on the rear axle with introduction of disturbance variables.
Figure 4:
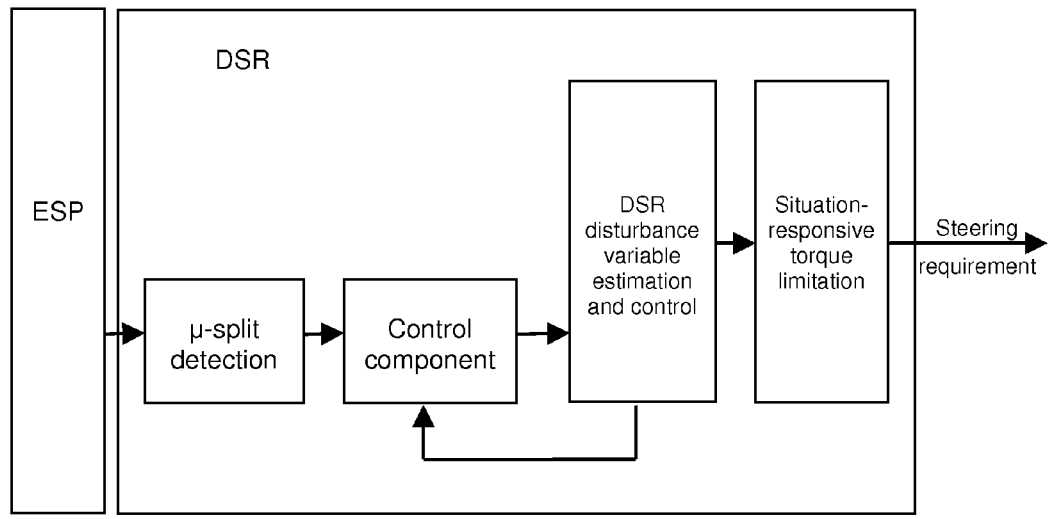
FIG. 4 is a schematic view of the steering recommendation to the driver DSR of FIG. 3.

FIG. 3 is a schematic representation of an integrated system for controlling electronically drivable elements in the steering line in order to provide the driver with a recommendation in critical situations by means of preset steering torques. A device is provided for this purpose, which is suitable to preset a steering wheel moment as a recommendation for the driver in critical situations. This device essentially comprises a driving dynamics controller ESP, a steering recommendation to the driver DSR and a steering system that can be actuated independently of the driver. The steering recommendation to the driver DSR comprises modules detecting the driving situations in which a steering recommendation about the additional steering torque to be set is output to the driver. The flag about the µ-split information determined in the ABS is read out in this module. Determining units, which calculate a preset steering torque based on the control components of the driving situations, are connected downstream of the modules for the driving situation detection. Inserted after these determining units is, in turn, a disturbance variable assessment, the load moment of which being constituted by at least the hand moment, the actual moment of the servo motor of the steering system, the steering angle and the steering angle velocity is superposed on the steering torque. The thus constituted total moment is compared with the hand moment applied by the driver to the steering wheel, and a recommendation is given to the driver in critical situations depending on the result of comparison regarding the set steering torque. According to an embodiment, the additional steering torque is limited or is preset as a fixed value depending on the situation.

Figure 5:
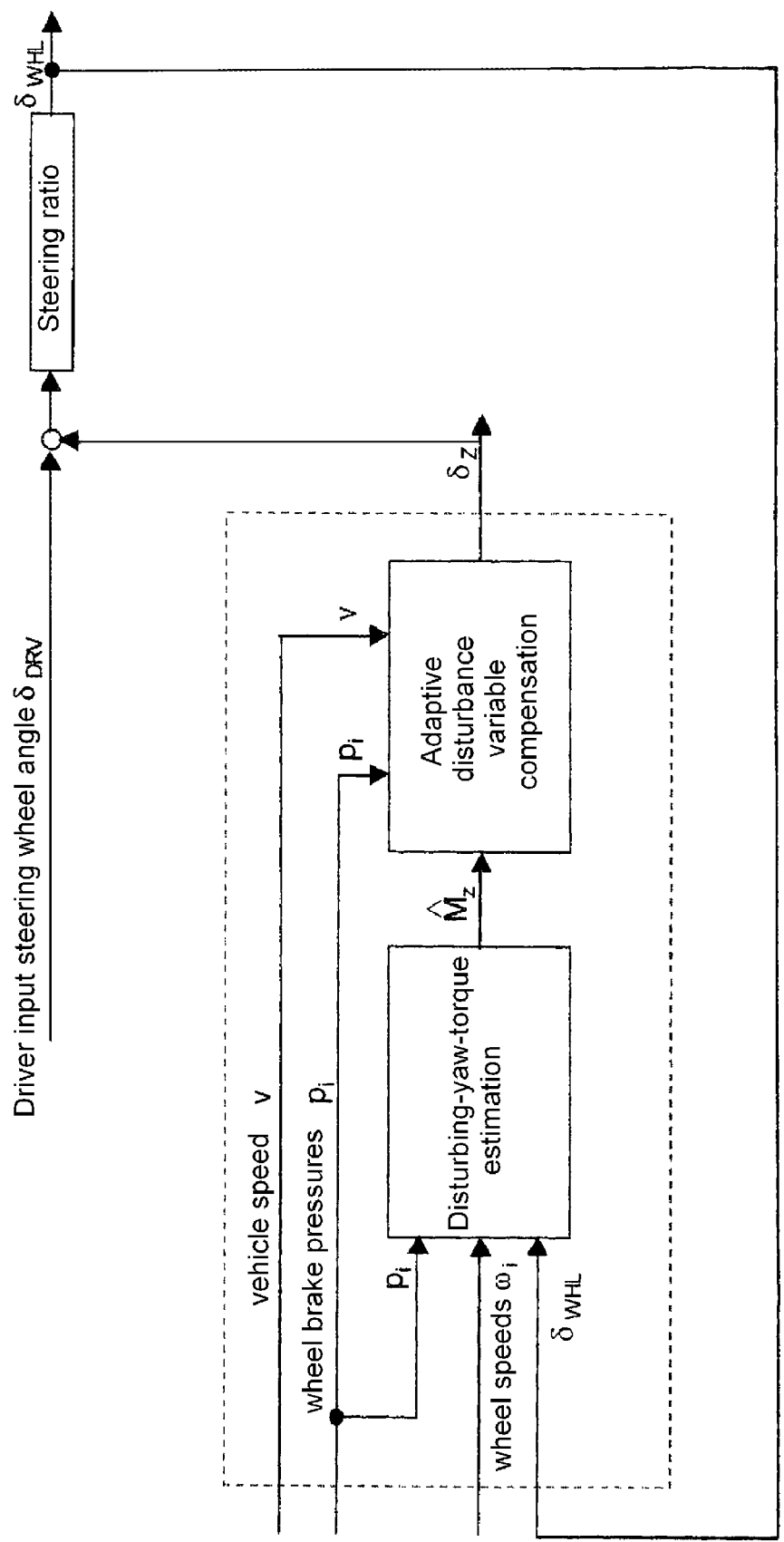
FIG. 5 is a representation of the introduction of disturbance variables with an estimation of the disturbance yaw torque.

FIG. 5 shows the determination of the steering lock angle of the wheel which is necessary for the automatic counter-steering maneuver and is calculated by a calculation unit based on the introduction of disturbance variables.

The steering lock angle is achieved by means of this introduction of disturbance variables or disturbance variable compensation of the disturbing yaw torque $\hat{M}_z$, which is produced by the asymmetric brake forces during a braking operation. This disturbing yaw torque is basically estimated in a determining unit initially from the brake pressure information of the individual wheels corresponding to the equations 1 and 2 on page 14. To this end, the wheel brake pressures $p_i$, the wheel rotational speeds $\omega_i$ and the fed back wheel locking angle $\delta_{WHL}$ are sent as input variables to the determining unit. To determine the wheel brake pressures, either an electronic brake system is required which estimates the brake pressures on the individual wheels on a model-based manner or monitors them, measures the brake pressures on the individual wheels by means of pressure sensors, or a brake-by-wire system (EHB/EMB) which is based on these variables. The determination of the disturbing yaw torque is based on the brake forces $\hat{F}_{x,i}$ on the wheels according to equation 2. As indicated in equation 1, the brake forces essentially can be calculated based on brake pressure information, or systems can also be employed which measure the brake forces directly (e.g. side wall torsion sensor, wheel hubs, or similar elements). The steering lock angle $\delta_Z$ required for the compensation of the disturbing yaw torque is adaptively calculated based on the estimated disturbing torque depending on driving condition variables (e.g. vehicle speed, brake pressure difference between high and low coefficients of friction, average brake pressure level, etc.).

This steering angle setting requirement is preferably added in an adder 31 and set in the active steering system in the form of an additional steering moment (wheel locking angle $\delta_{WHL}$).

In another design, the wheel locking angle $\delta_{WHL}$ is sent to an active steering system which readjusts the steerable wheels e.g. by means of an overriding steering system.

Equations:

1. Estimation of the brake forces based on the brake pressures:

Balance equation of a wheel neglecting the drive torque and assuming that the wheel contact force acts upon the wheel contact point $$J_{Whl}\dot{\omega}_i = M_{br,i} + F_{x,i} r_{Whl}.$$

From this results with the brake torque $M_{br,i} = B^* p_i$ for the estimation of the circumferential force $\hat{F}_{x,i}$ from brake pressure and wheel acceleration $$\hat{F}_{x,i} = \frac{1}{r} B^* p_i + \frac{1}{r} J_{Whl} \dot{\omega}_i.$$

It is possible to neglect the dynamic component $$\frac{1}{r} J_{Whl} \dot{\omega}_i$$

when accuracy requirements are less significant, and the relation $$\hat{F}_{x,i} = \frac{1}{r} B^* p_i.$$

results stationarily for the brake force.

2. Estimation of the disturbing yaw torque based on the brake forces

The disturbing yaw torque results for vehicles with a front-wheel steering system with the wheel locking angle $\delta$ and the vehicle geometry according to the illustration 8 by $$\hat{M}_z = \cos(\delta)[\hat{F}_{FL}s_{FL} - \hat{F}_{FR}s_{FR}] - \sin(\delta)[\hat{F}_{FL}l_F + \hat{F}_{FR}l_F] + \hat{F}_{RL}s_{RL} - \hat{F}_{RR}s_{RR}.$$

The invention claimed is:

1. A method of determining that a roadway is inhomogeneous in a driving situation of a vehicle disposed on a roadway having a different coefficient of friction (split μ) on a left side than on a right side, with a high-coefficient-of-friction side (HM) and a low-coefficient-of-friction side (LM), with one low-coefficient-of-friction front wheel and one high-coefficient-of-friction front wheel, during active anti-lock brake control by an anti-lock brake system (ABS) and active yaw torque control (YTC) of the high coefficient-of-friction front wheel, the method comprising the steps of:

filtering a rotational acceleration to determine the high-coefficient-of-friction front wheel;

verifying that at least the following conditions are satisfied to detect the roadway:

a) the low-coefficient-of-friction front wheel (LM wheel) undergoes anti-lock brake control in a pressure reduction phase and is in a first ABS control cycle;

b) the low-coefficient-of-friction front wheel exhibits a rotational deceleration exceeding a defined threshold;

c) the low-coefficient-of-friction front wheel locks at a brake pressure level that is lower than a defined threshold;

d) the high-coefficient-of-friction front wheel (HM wheel) exhibits a filtered rotational deceleration that is lower than a defined threshold; and e) a longitudinal vehicle deceleration calculated by the anti-lock brake system is lower than a defined threshold;

and generating output information representing that the roadway is inhomogeneous based on the conditions being satisfied.

2. The method as claimed in claim 1, comprising the further intermediate step of:

checking the determination of the roadway with sidewise different coefficients of friction for plausibility based on a review and evaluation of a rotational behavior of rear wheels consisting of one low-coefficient-of-friction rear wheel and one high-coefficient-of-friction rear wheel.

3. The method as claimed in claim 2, wherein the rotational behavior of the low-coefficient-of-friction rear wheel and the high-coefficient-of-friction rear wheel is evaluated by way of associated rotational deceleration values during ABS control.

4. The method as claimed in claim 1, wherein the pressure reduction phase of an ABS control cycle is determined based on variables obtained from wheel speeds and essentially reflecting a slip, an ABS wheel deceleration, a filtered ABS wheel deceleration and an integration of the ABS wheel deceleration with a feedback.

5. The method as claimed in claim 1, comprising the further step of setting a flag when the roadway is determined to be inhomogeneous, which flag can be read out by additional control systems.

6. The method as claimed in claim 5, comprising the further step of deleting the flag when at least one of the following two conditions is satisfied:

the yaw torque control becomes inactive;

a re-acceleration of the low-coefficient-of-friction front wheel after a pressure reduction phase is higher than a determined threshold.

7. A method of generating an additive steering moment during braking, the method comprising the steps of:

verifying that at least the following conditions are satisfied to detect the roadway:

a) the low-coefficient-of-friction front wheel (LM wheel) undergoes anti-lock brake control in a pressure reduction phase and is in a first ABS control cycle;

b) the low-coefficient-of-friction front wheel exhibits a rotational deceleration exceeding a defined threshold;
c) the low-coefficient-of-friction front wheel locks at a brake pressure level that is lower than a defined threshold;
d) a high coefficient-of-friction front wheel (HM wheel) exhibits a filtered rotational deceleration that is lower than a defined threshold;
e) a longitudinal vehicle deceleration calculated the anti-lock brake system is lower than a defined threshold;
generating output information representing that the roadway is inhomogeneous, and
applying an additional steering moment toward the low-coefficient-of-friction front wheel;
wherein the additional steering moment is applied to a steering wheel.

8. The method as claimed in claim 7, wherein the additional steering moment is determined from a disturbance variable compensation component $\Delta\delta_Z$ of a compensation steering angle requirement $\Delta\delta$ including differences of brake forces at braked wheels, and a steering angle predefined by the driver is modified depending on the disturbance variable compensation component.

9. The method as claimed in claim 8, wherein the compensation component $\Delta\delta_Z$ is determined based on quantities including a disturbing yaw torque $M_z$ which is established based on different brake forces.

10. The method as claimed in claim 9, wherein the disturbing yaw torque $M_z$ is determined by a logical linking of wheel locking angles linking of steered wheels, of brake pressures and of rotational wheel behavior.

11. The method as claimed in claim 10, wherein the brake forces are determined from the brake pressures according to the relation $$\hat{F}_{x,i} = f\{r, B, p_i, J_{Whl}, \dot{\omega}_i\}$$

with
$\hat{F}_{x,i}$ = brake force at a wheel i
r = dynamic tire radius
B = brake parameter
$p_i$ = wheel brake pressure
$J_{Whl}$ = inertia moment of the wheel
$\dot{\omega}_i$ = rotational acceleration of a wheel i.

12. The method as claimed in claim 10, wherein the disturbing yaw torque is determined according to the relation $$\hat{M}_z = f\{\hat{F}_{FL}, s_{FL}, \hat{F}_{FR}, s_{FR}, l_F, \hat{F}_{RL}, s_{RL}, \hat{F}_{RR}, s_{RR}, \delta\}$$

with
$\hat{F}_{FL}$ = Brake force front left
$s_{FL}$ = half track width of left front wheel
$\hat{F}_{FR}$ = brake force front right
$s_{FR}$ = half track width of right front wheel
$l_F$ = distance between front axle and center of gravity
$\hat{F}_{RL}$ = brake force rear left
$s_{RL}$ = half track width of left rear wheel
$\hat{F}_{RR}$ = brake force rear right
$s_{RR}$ = half track width of right rear wheel
$\delta$ = locking angle of steered wheels.

13. The method as claimed in claim 7, wherein the amount of the additional steering moment is calculated to allow a driver to hold on to a steering wheel in opposition to the additional steering moment.

14. The method as claimed in claim 7, wherein the additional steering moment is determined from a disturbance variable compensation component $\Delta\delta_Z$ of a compensation steering angle requirement $\Delta\delta$ including differences of brake forces at braked wheels,
wherein the brake forces are determined from brake pressures according to the relation $$\hat{F}_{x,i} = f\{r, B, p_i\}$$

with
$\hat{F}_{x,i}$ = brake force at a wheel i
r = dynamic tire radius
B = brake parameter.

15. A method of determining an inhomogeneous roadway in a driving situation of a vehicle disposed on a roadway having a different coefficient of friction (split μ) on a left side than on a right side (μ-split), with a high-coefficient-of-friction side (HM) and a low-coefficient-of-friction side (LM), with one low-coefficient-of-friction front wheel and one high-coefficient-of-friction front wheel, during active anti-lock brake control by an anti-lock brake system (ABS) and active yaw torque control (YTC) of the high-coefficient-of-friction front wheel, the method comprising the steps of
verifying that at least the following conditions are satisfied to detect the roadway:
a) the low-coefficient-of-friction front wheel (LM wheel) undergoes anti-lock brake control in a pressure reduction phase and is in a first ABS control cycle;
b) the low-coefficient-of-friction front wheel exhibits a rotational deceleration exceeding a defined threshold;
c) the brake pressure level at which the low-coefficient-of-friction front wheel locks is lower than a defined threshold;
d) a high coefficient-of-friction front wheel (HM wheel) exhibits a filtered rotational deceleration that is lower than a defined threshold;
e) a longitudinal vehicle deceleration calculated by ABS is lower than a defined threshold;
and generating an additional steering wheel moment which places a steering wheel in a position that hints toward a steering wheel position at which the vehicle can be stabilized.

16. The method as claimed in claim 15, wherein the additional moment is a predetermined constant.

* * * * *